United States Patent [19]

Leavitt

[11] Patent Number: 5,074,892
[45] Date of Patent: Dec. 24, 1991

[54] AIR SEPARATION PRESSURE SWING ADSORPTION PROCESS

[75] Inventor: Frederick W. Leavitt, North Tonawanda, N.Y.

[73] Assignee: Union Carbide Industrial Gases Technology Corporation, Danbury, Conn.

[21] Appl. No.: 530,285

[22] Filed: May 30, 1990

[51] Int. Cl.$^5$ .............................................. B01D 53/04
[52] U.S. Cl. ................................. 55/25; 55/58; 55/62; 55/68; 55/75
[58] Field of Search ............. 55/25, 26, 58, 62, 68, 55/75

[56] References Cited

U.S. PATENT DOCUMENTS

| | | | |
|---|---|---|---|
| 3,140,933 | 7/1964 | McKee | 55/68 |
| 3,237,377 | 3/1966 | Skarstrom | 55/58 X |
| 3,280,536 | 10/1966 | Berlin | 55/58 |
| 3,313,091 | 4/1967 | Berlin | 55/58 |
| 3,923,477 | 12/1975 | Armond et al. | 55/58 X |
| 4,065,272 | 12/1977 | Armond | 55/58 X |
| 4,144,037 | 3/1979 | Armond et al. | 55/58 |
| 4,477,265 | 10/1984 | Kumar et al. | 55/26 |
| 4,539,019 | 9/1985 | Koch | 55/58 X |
| 4,614,525 | 9/1986 | Reiss | 55/58 X |
| 4,684,377 | 8/1987 | Haruna et al. | 55/58 X |
| 4,810,265 | 3/1989 | Lagree et al. | 55/26 |
| 4,813,977 | 3/1989 | Schmidt et al. | 55/26 |
| 4,857,083 | 8/1989 | DiMartino | 55/26 |
| 4,859,217 | 8/1989 | Chao | 55/68 |
| 4,892,565 | 1/1990 | Schmidt et al. | 55/26 |
| 4,917,710 | 4/1990 | Haruna et al. | 55/26 |
| 4,925,460 | 5/1990 | Coe et al. | 55/25 |

*Primary Examiner*—Robert Spitzer
*Attorney, Agent, or Firm*—Alvin H. Fritschler

[57] ABSTRACT

PSA air separation processes are carried out using low adsorption/desorption pressure ratios, together with special adsorbents capable of desirably adsorbing nitrogen at the upper adsorption pressure level and of readily releasing nitrogen for discharge at the lower desorption pressure level.

34 Claims, No Drawings

AIR SEPARATION PRESSURE SWING ADSORPTION PROCESS

BACKGROUND OF THE INVENTION

1. Field of the Invention

The invention relates to pressure swing adsorption processing. More particularly, it relates to enhanced pressure swing adsorption processes for the separation of air.

2. Description of the Prior Art

In numerous chemical processing, refinery, metal production and other industrial operations, high purity oxygen and nitrogen streams are used for a variety of purposes. Thus, high purity nitrogen is used for purging, blanketing, the providing of metal treating atmospheres and other purposes. High purity oxygen is used in chemical processing and steel and paper mill applications, lead and glass production operations and the like. Nitrogen and oxygen are produced from air, typically by cryogenic distillation processing. While such processes can be very efficient, particularly for large gas volume applications, they require the use of complex and costly cryogenic processing equipment. Pressure swing adsorption (PSA) processing is particularly suited for such air separation operations, particularly for relatively small gas volume applications where a cryogenic air separation plant may not be economically feasible.

In the PSA process, as used for air separation, feed air is commonly passed to an adsorbent bed capable of selectively adsorbing nitrogen as the more readily adsorbable component of air at an upper adsorption pressure. Oxygen, as the less readily adsorbed component of air, is passed through and discharged from the bed. The bed is thereafter depressurized to a lower desorption pressure for desorption of said nitrogen and its removal from the bed prior to the introduction of additional quantities of feed air to the bed as cyclic adsorption-desorption operations are continued in said bed. As those skilled in the art will readily appreciate, the PSA process is commonly employed in multi-bed systems, with each bed undergoing the desired PSA processing sequence on a cyclic basis interrelated to the carrying out of such processing sequence in the other beds of the system.

A typical PSA air separation processing cycle consists of four processing steps; namely, (1) passage of feed air to the feed end of the bed, at the upper adsorption pressure, for selective adsorption of nitrogen and passage of oxygen from the opposite or discharge end or the bed; (2) depressurization or "blowdown" of the bed to the lower desorption pressure, with desorption of nitrogen and its removal from the feed end of the bed; (3) purge by the introduction of a purge stream to the bed from the discharge end thereof to further desorb and remove nitrogen from the feed end of the bed; and (4) repressurization of the bed to the upper adsorption pressure, with such sequence being repeated on a cyclic basis as additional quantities of feed air are passed to the PSA system on a continuous basis. Various modifications are known with respect to such PSA processing, with additional processing steps, such as full or partial pressure equalization steps for pressure recovery, being included, and other steps, such as the purge step, being omitted in particular PSA processing cycles.

In PSA processes based on the selective adsorption of nitrogen from air, commercially available adsorbent materials capable of selectively adsorbing nitrogen from air are employed in the adsorbent beds of the PSA system. Well known molecular sieves, such as 13X, 5A, and 10X and mordenite, are representative examples of adsorbent materials that can conveniently be employed for such PSA air separation processing. Molecular sieve materials generally tend to exhibit a large internal surface and thus have a high capacity for the selective adsorption of nitrogen from air. They are also polar in nature, which property leads to the selective adsorption of nitrogen relative to oxygen. Such molecular sieve materials are complex "framework" structures that can exist in many different structural modifications. In addition, the polar ions inherent in zeolitic molecular sieves can be modified by ion-exchange processing. Thus, there are many different molecular sieve adsorbent materials known in the art that are more or less satisfactory for use in PSA air separation processes. The selective or preferential adsorption of nitrogen, relative to oxygen, may be quantified in terms of "separation factor". There have been efforts in the art to develop particular adsorbent materials having a high separation factor for air separation operations, together with a high adsorptive capacity for the selectively adsorbed nitrogen.

The sodium form of the faujasite-type Zeolite X has often been used to advantage in PSA air separation processes. It has been suggested that improved adsorption of nitrogen can be achieved by exchanging the sodium ions with divalent ions. McKee, U.S. Pat. No. 3,140,932, discloses high separation factors for nitrogen to oxygen for CaX, SrX, BaX and NiX. Sircar et al, U.S. Pat. No. 4,557,736, disclose that a binary ion exchanged X-zeolite, with both Ca and Sr ions, has a particularly high adsorption of nitrogen at superatmospheric pressure, with 5–40% of the cations being $Ca^{++}$ and 60–95% being $Sr^{++}$ in preferred embodiments.

The McKee patent referred to above considers the relative merits of various alkali metal cation forms of zeolite X, and indicates that the $Li^+$ form is superior for the selective adsorption of nitrogen from air. This form of adsorbent was found to have a high adsorptive capacity, even at temperatures as high as 0° C. Nitrogen to oxygen separation factors as high as 6.8 were measured. Furthermore, the loading separation factor actually increased with increasing temperature. More recently, Chao, U.S. Pat. No. 4,559,217, disclosed that highly lithium-exchanged zeolite X, with at least 88% of the cation sites occupied by $Li^+$, has a higher than expected separation factor for nitrogen from air in conventional PSA processing operations, with separation factors as high as 10.9 at one atmosphere adsorption pressure and ambient pressure conditions. Furthermore, high differential nitrogen loadings on the adsorbent material were found for adsorption at 1500 torr as compared to 150 torr.

It is known in the art, therefore, that various modifications can be made to the zeolite structure of desirable adsorbent materials to enhance the selective adsorption of nitrogen from air. By the use of such modified adsorbents, it is thus possible to improve the adsorption step of PSA air separation processes. While this represents a desirable advance in the art, it does not, unfortunately, necessarily result in an improvement in the overall PSA air separation processing. Adsorbents that tend to more effectively and selectively adsorb nitrogen from air under upper adsorption pressure conditions also tend to hold the nitrogen more strongly under the lower pressure desorption conditions. Moreover, the overall cost and efficiency of the PSA process may depend as much on the desorption steps as on the adsorption steps of the overall process. This is equally true when the desorption operation is carried out under vacuum conditions or at about atmospheric conditions.

If efficient utilization of the adsorbent were the only pertinent consideration, it would be desirable to completely desorb the selectively adsorbed nitrogen during the bed regeneration portion of each PSA cycle, so that the total loading capacity of the adsorbent would be available during the next succeeding adsorption portion of the cycle. The best adsorbent for use in such a process would be a material that exhibited the highest nitrogen loading capacity and the largest nitrogen-to-oxygen separation conditions under the desired adsorption conditions. Complete desorption would require a very deep vacuum. The equipment needed to achieve such deep vacuum conditions is costly, and the operating costs associated with such operations are very high. Practical PSA processing operations, particularly those designed for desirable power efficiency, must operate with a partial desorption operation carried out at a lower desorption pressure level that is, nevertheless, well above the deep vacuum conditions that would be needed for complete desorption.

In meeting the ever more stringent requirements of industrial activities, PSA air separation operations are dependent on the continued development of advanced adsorbent materials for the selective adsorption of nitrogen under practical operating conditions. In turn, the effective use of such advanced adsorbent materials requires the development of PSA operating features so as to achieve overall PSA air separation performance capable of fulfilling the requirements of practical commercial operations. As indicated above, a variety of PSA processing cycles and features are known in the art. The overall efficiency of each PSA system and processing cycle will be understood to depend upon the particular features thereof. However, the dominant factor respecting the total energy requirements of a particular PSA operation is the pressure ratio of the maximum upper adsorption pressure to the minimum lower desorption pressure. Various developments have been made to advance the PSA air separation art in the overall direction of lower cost, more efficient separation operations. Thus, Lagree and Leavitt, U.S. Pat. No. 4,810,265, disclose a two-bed vacuum PSA process and system for the production of nitrogen from air, utilizing a cocurrent product purge and a countercurrent oxygen purge, developed for low power consumption and capital costs. Improved vacuum PSA processing for the production of oxygen from air has also been proposed, utilizing simple processing equipment, having low capital costs, which can be operated at power consumption levels similar to, or lower than, other commercial PSA processes.

Despite such considerable advances in the PSA art for the separation of air into oxygen and/or nitrogen product streams, there is a genuine need in the art for more efficient PSA air separation processes. Such need, to satisfy the demands of existing and contemplated industrial applications for such oxygen and/or nitrogen products, necessitates the development of more efficient processes for air separation to produce high purity oxygen and nitrogen products, particularly at very low power consumption levels.

It is an object of the invention, therefore, to provide an improved PSA process for the air separation applications.

It is another object of the invention to provide an improved PSA process for the production of oxygen (and argon) and nitrogen component streams at advantageously low power consumption levels.

It is a further object of the invention to provide an improved process for the production of high purity oxygen.

It is a further object of the invention to provide a PSA process for air separation capable of achieving very low power consumption, together with capital costs similar to, or lower than, those associated with conventional PSA operations.

With these and other objects in mind, the invention is hereinafter described in detail, the novel features thereof being particularly pointed out in the appended claims.

SUMMARY OF THE INVENTION

PSA air separation processes are carried out for oxygen/argon and/or nitrogen production employing advantageously low pressure ratios, together with special adsorbents capable of selectively adsorbing nitrogen from air at high storage separation factors for nitrogen over oxygen at upper adsorption pressure levels and ready desorption and discharge of nitrogen at the lower desorption pressure level.

DETAILED DESCRIPTION OF THE INVENTION

The objects of the invention are accomplished by the carrying out of PSA processing cycles with low pressure ratios in systems containing special adsorbent materials that are capable of enhanced performance under such low pressure ratio adsorption-desorption processing conditions.

Contrary to PSA processes endeavoring to achieve high levels of adsorption at elevated upper adsorption pressures and essentially complete desorption under deep vacuum conditions, the process of the invention is operated at low pressure ratios. As employed herein, the pressure ratio of the process is the ratio of the highest pressure reached during the upper adsorption pressure portion of the PSA cycle to the lowest pressure reached in the lower desorption portion of the cycle. The use of such a low pressure ratio will be seen to allow the use of simple and inexpensive blowers and fans, rather than expensive compression equipment.

In the separation of nitrogen or oxygen, i.e. oxygen/argon, from air, it is common practice to select adsorbents solely on the basis of high nitrogen loadings and high nitrogen selectivity over oxygen and argon at the upper adsorption pressure and feed air temperature conditions. In PSA cycles operated at a high pressure ratio, such an adsorbent selection process is adequate, since the residual loadings are desirably low at the lower desorption pressure level. Such high pressure ratios can be achieved using a high or deep vacuum, i.e. a very low desorption pressure, or by using a very high adsorption pressure, or by using both. Such approaches are expensive and use considerable power because of the high compression ratios employed, and the expensive compressor and/or vacuum pump required.

It is simpler and less expensive to use low pressure ratios, as by using a relatively low adsorption pressure, or by using a shallow vacuum or near-ambient desorption pressure. When a low pressure ratio is employed, the recovery of desired product, e.g. oxygen, is lowered, and too low a recovery level can wipe out the benefit of gains on power consumption by adding to the amount of feed air and off-gas that must be handled. Low recovery levels also serve to increase the required adsorbent bed sizes. It is necessary, therefore, to achieve reasonably high recovery levels when low pressure ratios are employed. When low pressure ratios are employed, the residual loading of nitrogen, at the end of the desorption step, is a significant fraction of the peak loading, unless a large amount of purge gas is employed. The loading and selectivity of the more readily adsorbable nitrogen component of feed air, during desorption as well as during adsorption, will thus be seen as not negligible factors, but important to the efficiency of the overall cycle.

PSA cycles are complex, dynamic, non-steady-state processes. It will be appreciated from the discussion above that the use of low pressure ratios, and the achieving of the benefits thereof, is not readily accomplished in practical commercial operations. It has also been found that the limiting ratio of the countercurrent flow rate employed in the desorption and purge, i.e. regeneration, portions of the cycle to the cocurrent flow during the feed-adsorption portions of the cycle is higher for low pressure ratio cycles than for high pressure ratio cycles. As a result, more gas must be compressed per unit of product recovered. The low pressure ratio cycles require less power, however, only if the amount of gas being compressed is not increased too much by the use of low pressure ratio cycles.

In light of all of these factors, it is critically important that the adsorbent used be capable of generating a large increase in nitrogen concentration during the depressurization operation, so that the feed-to-product and waste-to-product flow ratios can be maintained as low as possible. It has been found that, in practical commercial operations, the benefits of operating at a low pressure ratio can only be achieved using particular adsorbents capable of selectively adsorbing nitrogen at a high separation factor at the upper adsorption pressure and also of readily desorbing said nitrogen for ready discharge at the lower desorption pressure employed in such low pressure ratio applications.

While the exchange of sodium ions with divalent ions has been generally desired to increase nitrogen adsorption, the adsorbents found useful for the practice of the invention are the highly lithium exchanged forms of zeolite X referred to above and the caustic-digested form of zeolite 13 X. This has been determined in the course of comparative examples utilizing computerized simulations of the complete cycle for the adiabatic PSA operations. Although an objective of the invention is to reduce the power and operating costs of the PSA operation, by the practical use of low pressure ratios, it is also important to consider the amount of adsorbent required, particularly where, as in the practice of the invention, the adsorbent employed is a specialty material. The adsorbent requirement can be conveniently expressed in terms of a "bed size factor" or "BSF". In a PSA process, the BSF represents the quantity of adsorbent needed to produce a ton of product, e.g., oxygen, in the product stream. The BSF is directly proportional to the PSA cycle time and inversely proportional to the differential gas storage on the adsorbent and the product, e.g. oxygen, recovery. Unfortunately, both the recovery and the differential or delta storage will generally decrease as the pressure ratio is decreased, thus making the BSF larger. On the other hand, the oxygen recovery depends strongly on the average nitrogen concentration in the waste stream discharged from the feed end of the bed. When this concentration is made high by employing the adsorbents under the low pressure ratio conditions of the invention, the BSF tends to be made smaller.

EXAMPLE 1

Transatmospheric PSA cycle at a pressure ratio of 21:1

On this example using sodium X(NaX or 13X) adsorbent, the upper adsorption pressure was 150 kPa and the lower desorption pressure was 7 kPa, with the pressure ratio being 21/1. The power requirements for this cycle with respect to 15 ton-per-day oxygen production are 117 kw. The BSF is about 671. This example represents a typical, conventional high pressure ratio PSA air separation operation, using a conventional adsorbent for the selective adsorption of nitrogen from feed air under adiabatic PSA operating conditions.

EXAMPLE 2

Transatmospheric PSA cycle at a pressure ratio of 6:1

Using an upper adsorption pressure of 150 kPa and a lower desorption pressure of 25 kPa, providing a pressure ratio of 6:1, the comparative results shown in Table I were determined under adiabatic conditions at feed temperatures not less than 300° K. A countercurrent purge gas was employed up to the point at which 80% of the maximum flow to oxygen breakthrough was attained.

TABLE I

| Adsorbent | Storage Selectivity | Power (kw) | BSF |
|---|---|---|---|
| NaX (13X) | 2.67 | 100 | 914 |
| CaX | 5.23 | 178 | 1,174 |
| NaX (c.d.) | 3.68 | 94 | 379 |
| LiX (2.5) | 5.52 | 88 | 468 |
| LiX (2.0) | 7.03 | 79 | 386 |

The NaX material employed is the sodium form of the faujasite-type zeolite commonly known as NaX or 13X, the same conventional adsorbent used in Example 1. The other adsorbents represent modifications of the basic NaX that can be produced by ion exchange or other special treatments. CaX, a divalent cation material such as desired in the conventional art to increase the adsorption of nitrogen at upper adsorption pressure, is produced by replacing the $Na^+$ ions in NaX with half as many $Ca^{++}$ ions. LiX is similarly produced by replacing $Na^+$ with $Li^+$, with 95% of its $AlO_2$ tetrahedral units associated with lithium cations. LiX (2.5) refers to LiX with a normal ratio of $Si/Al_2$ of 2.5, while LiX (2.0) results from treatment to lower the $Si/Al_2$ ratio to 2.0. NaX (c.d.) represents a form of NaX that has been digested in a caustic solution for several hours at an elevated temperature, said material having an increased zeolite content. The caustic treatment is also believed to remove debris from the pore structure making the adsorption sites more accessible. It should be noted that all of the above adsorbents exhibit improved performance at higher activation, that is at lower residual water content.

While the power requirement for the NaX of Table I is less than that of Example I, i.e., 100 kw instead of 117 kw, showing that the lower-pressure-ratio cycle is more energy efficient, the BSF increased when the lower pressure ratio was employed. All of the specially prepared adsorbents had a higher selectivity than NaX. In spite of such higher selectivity, however, CaX will be seen to require more power and to have a higher BSF than NaX. The other special adsorbents have lower power needs and lower BSF values. The lowest power requirements are for LiX (2.0), which required 21% less power than said NaX.

EXAMPLE 3

Transatmospheric PSA cycle at a pressure ratio of 2:1

The same five adsorbents employed in Example 2 were employed in a PSA cycle having an upper adsorption pressure of 140 kPa and a lower desorption pressure of 70 kPa, i.e., at a pressure ratio of 2/1, much lower than employed in conventional PSA air separation processes.

The results were as follows:

TABLE II

| Adsorbent | Storage Selectivity | Power (kw) | BSF |
|---|---|---|---|
| NaX (13X) | 2.82 | 91 | 3,069 |
| CaX | 3.65 | 176 | 3,706 |
| NaX (c.d.) | 3.73 | 79 | 835 |
| LiX (2.5) | 5.45 | 73 | 1,127 |
| LiX (2.0) | 7.73 | 66 | 830 |

The results recited in Table II show that the power requirements of all of the adsorbents are reduced by reducing the pressure ratio to 2:1. The reduction is very small for CaX, which still has a higher power factor under such conditions. Both LiX (2.0) and LiX (2.5) desirably require only 83-84% of the power required for the 6:1 cycles of Example 2. This gain in power efficiency will be seen to be at the expense of a considerably larger BSF at the lower pressure ratio. This may be offset somewhat by reducing the cycle time in actual practice, since the lower-pressure-ratio cycle would be expected to require less time for the changing pressure steps of the overall cycle. Those skilled in the art will appreciate, furthermore, that the power savings is a generally more significant economic factor than is the BSF requirements.

The transatmospheric cycles of Examples 2 and 3 are understood to require a feed compressor or blower and a vacuum pump. It would, in some instances, be desirable to eliminate one of said pumps. This is possible with the low pressure ratio practice of the invention, but may not be feasible when a high pressure ratio is employed. If the desorption pressure were raised to above one atmosphere in the high pressure ratio operation in order to eliminate the need for a vacuum pump, the upper adsorption pressure would necessarily be very high, and most of the known adsorbent materials are found to have poor adsorbent characteristics at such high pressures. Conversely, if the feed air were maintained at atmospheric pressure, a deep vacuum would be needed for desorption of nitrogen, and this would require the use of expensive vacuum pumps. Such restrictions may no longer apply when it is desired to eliminate one of the pumps under low pressure ratio conditions.

EXAMPLE 4

Subatmospheric PSA cycles at a pressure ratio of 2:1

Using a feed air pressure of 100 kPa (0.99 atm) and a desorption pressure of 50 kPa (0.495 atm) in a PSA air separation operation otherwise as set forth with respect to the examples above, the following results are obtained:

TABLE III

| Adsorbent | Storage Selectivity | Power (kw) | BSF |
|---|---|---|---|
| NaX (13X) | 2.76 | 77 | 2,186 |
| CaX | 4.79 | 124 | 3,014 |
| NaX (c.d.) | 3.39 | 67 | 1,152 |
| LiX (2.5) | 6.58 | 65 | 1,045 |
| LiX (2.0) | 8.10 | 53 | 984 |

The results set forth in Table III show a further decrease in power for all of the adsorbents tested. It will be seen that LiX (2.0) has the lowest power requirements, only ⅔ of the power required for LiX (2.0) in the 6:1 pressure ratio for a transatmospheric cycle, and only 45% of the power required for standard NaX (13X) adsorbent at a typical prior art pressure ratio of 21:1, as in Example 1. It should be noted that LiX (2.0) exhibits very high adsorption characteristics at atmospheric pressure as shown by the selectivity value in Table III. It will also be noted that LiX (2.5) and NaX (c.d.) also have desirably low power requirements and very low BSF values. CaX, the divalent cation exchanged material, has enhanced selectivity for nitrogen as compared with NaX material, but is shown to have very high power requirements and BSF characteristics. This is consistent with the view expressed above that the use of divalent cations will provide enhanced selectivity, but not the overall desirable characteristics, particularly power savings, desired in practical commercial operations and achieved in the practice of the subject invention.

EXAMPLE 5

Superatmospheric PSA cycles at a pressure ratio of 2:1

In these comparative tests selective to the examples above, a feed air, upper adsorption pressure of 204 kPa (2.02 atm) and a lower desorption pressure of 102 kPa (1.01 atm) are employed, providing the low pressure ratio of 2:1, with the results being as set forth in Table IV below.

TABLE IV

| Adsorbent | Storage Selectivity | Power (kw) | BSF |
|---|---|---|---|
| NaX (13X) | 2.65 | 143 | 1,342 |
| CaX | 2.77 | 404 | 5,481 |
| NaX (c.d.) | 3.51 | 126 | 783 |
| LiX (2.5) | 4.82 | 123 | 1,012 |
| LiX (2.0) | 6.97 | 107 | 719 |

As shown in Table IV, more power is required for a superatmospheric cycle than for transatmospheric and subatmospheric cycles. This is consistent with the general trend of the art to the use of vacuum cycles, typically, as noted above, in combination with highly selective adsorbents and deep vacuums for the desorption of the more readily adsorbable nitrogen component of feed air. Nevertheless, there may be external factors that favor, or even render mandatory in some instances, the use of PSA cycles that do not involve vacuum pressure levels. From the results recited in Table IV, the lowest power, and the lowest bed size factor (BSF), are found to be achieved utilizing LiX (2.0) material. As will be noted, said LiX (2.0) provided the most favorable power values under all of the test conditions, and nearly always the lowest BSF.

In the practice of the invention, adsorbent materials are employed that are able to desorb nitrogen readily under the desired low-pressure ratio conditions, so as to achieve a high concentration of nitrogen in the desorption effluent stream. As will be indicated from the results of the comparative tests referred to in Examples 1-5 above, LiX(2.0) is the preferred adsorbent for use in the process of the invention. Other adsorbents derived from NaX by ion exchange with monovalent cations, e.g. LiX(2.5), or by caustic digestion, or both, can be used to achieve significant reductions in the power required to operate the PSA cycle while achieving advantageous storage selectivity and bed size factor properties.

The highly lithium exchanged forms of zeolite X that can be used to advantage in the practice of the invention comprise zeolite X adsorbent having a framework $SiO_2/Al_2O_3$ molar ratio not greater than 3.0 and having at least 88% of its $AlO_2$ tetrahedral units associated with lithium cations, with preferably at least 95% of said $AlO_2$ tetrahedral units being associated with lithium cations. More preferably, said lithium exchange is from about 95% to about 97%, or above. Such special adsorbent materials include, but are not limited to, materials such as the preferred LiX(2.0), on which the $SiO_2/Al_2O_3$ molar ratio is 2.0, LiX(2.5), on which said molar ratio is 2.5, or other materials in which said ratio is from 2.0 to 2.5. As indicated above, such lithium exchanged materials are described in detail in the Chao patent, U.S. Pat. No. 4,859,217.

The caustic digested NaX materials comprise zeolitic NaX adsorbent crystals treated with caustic to remove soluble, non-crystalline debris, resulting in increased accessibility of more of the exposed cations leading to higher adsorptive capacity and the more efficient use of the pore system of the adsorbent. The caustic treatment process typically involves contact of the NaX material with a clay binder to form beads that are heated to a suitable temperature, such as about 1200° F., followed by washing with a suitable solution, such as 2.5 weight % of NaOH, for several hours, drying and calcining, as at elevated temperatures up to about 600° C. Such clay conversion and caustic solution treatment are also believed to convert imperfections in the zeolite structure of the NaX, such as localized amorphous regions, to crystalline regions after the adsorbent particles have formed, but before they are activated. A kaolin-type clay is generally used, said clay converting to meta-kaolin after thermal treatment at 550° C. Subsequent treatment with NaOH solution (caustic digestion) completes a conversion of part of the clay binder to zeolite begun after the adsorbent particles are formed, thereby increasing the zeolite content to a desirably high level, e.g. in excess of 90%.

The low pressure ratio employed in the practice of the invention for the production of oxygen from air is subject, in practical commercial particular pressure levels involved. For operation in the subatmospheric (vacuum) range in which the upper adsorption pressure is at a slightly below atmospheric pressure, the low pressure ratio employed will range from about 1.4 to about 4.0, preferably about 2.0 to 4.0 to achieve a meaningful improvement in commercial practice. For transatmospheric cycles in which the upper adsorption pressure is above atmospheric pressure and the lower desorption pressure is below atmospheric pressure, the same pressure ratio ranges are generally applicable as for subatmospheric cycles. In superatmospheric cycles, i.e. with the upper adsorption pressure being above atmospheric pressure and the lower desorption pressure being at or slightly above atmospheric pressure, the low pressure ratio employed will generally range from about 1.4 to about 2.5, preferably about 2.0. The invention, in its various embodiments, will usually employ adsorption pressures up to 1 or 2 atmospheres, and desorption pressures as low as from about 0.25 to 1.0 atmospheres.

Those skilled in the art will appreciate that various changes can be made in the details of the invention without departing from the scope of the invention as recited in the appended claims. Thus, other adsorbents derived from NaX in exchange with monovalent cations, such as potassium, or by caustic digestion, by a combination thereof, can be employed. Likewise, the PSA system and processing cycle employed can be subject to variation depending upon the requirements of a given application. Thus, while two bed PSA systems are conveniently employed, the use of systems containing three or more beds can also be employed. While the typical PSA air separation processing cycle referred to above can be used in the practice of the invention, it will be appreciated that any other commonly employed PSA processing steps desired for particular cycles can also be employed. The examples provided above were air separation operations adapted for the production of oxygen from air, using the indicated adsorbents for the selective adsorption of nitrogen. In such examples, oxygen, the less selectively adsorbed component of feed air, is passed through and discharged from the bed. When nitrogen is the desired product, the same adsorbents can be used, with nitrogen, the more readily adsorbed component, being desorbed from the adsorbent and recovered as the desired product. The Lagree and Leavitt patent, U.S. Pat. No. 4,810,265, discloses a particular and desirable processing cycle for such PSA-nitrogen operations, employing a transatmospheric cycle and a pressure ratio of about 5:1. A portion of the nitrogen desorbed at low pressure is recompressed and used for cocurrent purge purposes in the adsorbent bed at upper adsorption pressure. For satisfactory operation of such cocurrent displacement cycles, it is important that the adsorbed nitrogen be readily released when the bed is depressurized and backpurged. The same requirements for ready desorption thus apply to PSA processes for nitrogen production as for PSA processes in which oxygen is the desired product. The low pressure ratio ranges described above are generally applicable to nitrogen production operations although it will be appreciated that some variation in desired low pressure ratio values may pertain depending on whether oxygen or nitrogen is the desired product and the details of the particular PSA system and process employed to achieve a desired result.

The invention will be seen to represent a significant advance in the art of employing PSA technology for air separation purposes. By enabling oxygen or nitrogen to be produced by the advantageous use of PSA systems and processes with low energy requirements and at reasonable adsorbent utilization levels, the invention contributes to the desired development of more efficient processes for the production of high purity oxygen and nitrogen products to satisfy the demands of industrial operations, particularly the desire for advantageously low power consumption levels.

I claim:

1. In a pressure swing adsorption process for the separation of air, employing a pressure swing adsorption system containing at least two adsorbent beds of adsorbent material capable of selectively adsorbing nitrogen from feed air, with oxygen and argon passing through and being discharged from the beds, said process in each bed comprising, on a cyclic basis, (a) adsorption at an upper adsorption pressure, with feed air being passed to the bed at a first, feed end thereof, with unadsorbed oxygen and argon being recovered from the bed at a second, recovery end thereof, and (b) desorption at a lower desorption pressure, with gas being removed from the first, feed end thereof upon decrease in the pressure of the bed from said upper adsorption pressure to said lower desorption pressure, with nitrogen adsorbed on the bed during step (a) above being desorbed from the bed and present in the gas removed from the first, feed end of the bed, the improvement comprising carrying out the process under subatmospheric cycle conditions in which the upper adsorption pressure is at or slightly below atmospheric pressure and the lower desorption pressure is a subatmospheric pressure, with the pressure ratio between the adsorption pressure and the desorption pressure being maintained at a low level in the range of from about 1.4:1 to about 4:1, said adsorbent material comprising NaX zerolite adsorbent highly exchanged to replace $Na^+$ ions therein with monovalent cations and/or modified by caustic digestion at elevated temperature to increase the zerolite content thereof, said adsorbent material having a high oxygen-argon/nitrogen separation factor coupled with an ability to provide a ready desorption of nitrogen at said low level of pressure ratio between the upper adsorption pressure and the lower desorption pressure, the ready desorption of nitrogen enabling the average nitrogen concentration in the gas removed from the first, feed end of the bed to be enhanced, thereby enabling oxygen and argon recovery to be enhanced and reducing the amount of said adsorbent material needed to recover a given amount of oxygen and argon, whereby the separation of oxygen and argon from nitrogen is accomplished with an advantageous combination of low power assumption, enhanced oxygen and argon recovery, and enhanced adsorbent utilization as a result of the high separation factor of the adsorbent material coupled with the enhanced ability of said adsorbent material to readily desorb nitrogen at said low pressure ratio between the upper adsorption pressure and the lower desorption pressure.

2. The process of claim 1 in which said pressure ratio range is from about 2:1 to about 4:1.

3. The process of claim 1 in which said adsorbent comprises lithium exchanged NaX having at least about 88% of its $AlO_2$ tetrahedral units associated with lithium cations.

4. The process of claim 3 in which the molar ratio of the $SiO_2/Al_2O_3$ framework of said NaX is less than 3.0.

5. The process of claim 4 in which said $SiO_2/Al_2O_3$ molar ratio is from 2.0 to 2.5.

6. The process of claim 5 in which said lithium exchange is at least about 95%.

7. The process of claim 6 in which said $SiO_2/Al_2O_3$ molar ratio is 2.0.

8. The process of claim 7 in which said pressure ratio range is from about 2:1 to about 4:1.

9. The process of claim 6 in which said $SiO_2/Al_2O_3$ molar ratio is 2.5.

10. The process of claim 9 in which said pressure range is from about 2:1 to about 4:1.

11. The process of claim 5 in which said lithium exchange is about 97%.

12. The process of claim 1 in which said adsorbent comprises NaX zeolite adsorbent modified by caustic digestion at elevated temperature to increase the zeolite content thereof.

13. The process of claim 12 in which said pressure ratio range is from about 2:1 to about 4:1.

14. In a pressure swing adsorption process for the separation of air, employing a pressure swing adsorption system containing at least two adsorbent beds of adsorbent material capable of selectively adsorbing nitrogen from feed air, with oxygen and argon passing through and being discharged from the beds, said process comprising, on a cyclic basis, (a) adsorption at an upper adsorption pressure, with feed air being passed to the bed at a first, feed end thereof, with unadsorbed oxygen and argon being recovered from the bed at a second, recovery end thereof, and (b) desorption at a lower desorption pressure, with gas being removed from the first, feed end thereof upon decrease in the pressure of the bed from said upper adsorption pressure to said lower desorption pressure, with nitrogen adsorbed on the bed during step (a) above being desorbed from the bed and present in the gas removed from the first, feed end of the bed, the improvement comprising carrying out the process under transatmospheric cycle conditions in which the upper adsorption is above atmospheric pressure and the lower desorption pressure is below atmospheric pressure, with the pressure ratio between the adsorption pressure and the desorption pressure being maintained at a low level in the range of from about 1.4:1 to about 4:1, said adsorbent material comprising NaX zeolite adsorbent highly exchanged to replace $Na^+$ ions therein with monovalent cations and/or modified by caustic digestion at elevated temperature to increase the zeolite content thereof, said adsorbent material having a high oxygen-argon/nitrogen separation factor coupled with an ability to provide a ready desorption of nitrogen at said low level of the pressure ratio between the upper adsorption pressure and the lower desorption pressure, the ready desorption of nitrogen enabling the average nitrogen concentration in the gas removed from the first, feed end of the bed to be enhanced, thereby enabling oxygen and argon recovery to be enhanced and reducing the amount of said adsorbent material needed to recover a given amount of oxygen and argon, whereby the separation of oxygen and argon from nitrogen is accomplished with an advantageous combination of low power consumption, enhanced oxygen and argon recovery, and enhanced adsorbent utilization as a result of the high separation factor of the adsorbent material coupled with the enhanced ability of said adsorbent material to readily desorb nitrogen at said low pressure ratio between the upper adsorption pressure and the lower desorption pressure.

15. The process of claim 14 in which said pressure ratio range is from about 2:1 to about 4:1.

16. The process of claim 15 in which said adsorbent comprises lithium exchanged NaX having at least about 88% of its $AlO_2$ tetrahedral units associated with lithium cations.

17. The process of claim 16 in which the molar ratio of the $SiO_2/Al_2O_3$ framework of said NaX is less than 3.0.

18. The process of claim 17 in which said SiO$_2$/Al$_2$O$_3$ molar ratio is from 2.0 to 2.5.

19. The process of claim 18 in which said lithium exchange is at least about 95%.

20. The process of claim 19 in which said SiO$_2$/Al$_2$O$_3$ molar ratio is 2.0.

21. The process of claim 19 in which said SiO$_2$/Al$_2$O$_3$ molar ratio is 2.5.

22. The process of claim 18 in which said lithium exchange is about 97%.

23. The process of claim 14 in which said adsorbent comprises NaX zeolite adsorbent modified by caustic digestion at elevated temperature to increase the zeolite content thereof.

24. The process of claim 23 in which said pressure ratio range is from about 2:1 to about 4:1.

25. In a pressure swing adsorption process for the separation of air, employing a pressure swing adsorption system containing at least two adsorbent beds of adsorbent materials capable of selectively adsorbing nitrogen from feed air, with oxygen and argon passing through and being discharged from the beds, said process comprising, on a cyclic basis (a) adsorption at an upper adsorption pressure, with feed air being passed to the bed at a first, feed end thereof, with unadsorbed oxygen and argon being recovered from the bed at a second, recovery end thereof, and (b) desorption at a lower desorption pressure, with gas being removed from the first, feed end thereof upon decrease in the pressure of the bed from said upper adsorption pressure to said lower desorption pressure, with nitrogen adsorbed on the bed during step (a) above being desorbed from the bed and present in the gas removed from the first, feed end of the bed, the improvement comprising carrying out the process under superatmospheric conditions in which said upper adsorption pressure is above atmospheric pressure and said lower desorption pressure is at or slightly above atmospheric pressure, with the pressure ratio between the adsorption pressure and the desorption pressure being maintained at a low level in the range of from about 1.4:1 to about 2.5:1, said adsorbent material comprising NaX zeolite adsorbent highly exchanged to replace Na$^+$ions therein with monovalent cations and/or modified by caustic digestion at elevated temperature to increase the zeolite content thereof, said adsorbent material having a high oxygen-argon/nitrogen separation factor coupled with an ability to provide a ready desorption of nitrogen at said low level of the pressure ratio between the upper adsorption pressure and the lower desorption pressure, the ready desorption of nitrogen enabling the average nitrogen concentration in the gas removed from the first, feed end of the bed to be enhanced, thereby enabling oxygen and argon recovery to be enhanced and reducing the amount of said adsorbent material needed to recover a given amount of oxygen and argon, whereby the separation of oxygen and argon from nitrogen is accomplished with an advantageous combination of low power consumption, enhanced oxygen and argon recovery, and enhanced adsorbent utilization as a result of the high separation factor of the adsorbent material coupled with the enhanced ability of said adsorbent material to readily desorb nitrogen at said low pressure ratio between the upper adsorption pressure and the lower desorption pressure.

26. The process of claim 25 in which said pressure ratio range is about 2.0.

27. The process of claim 25 in which said absorbent comprises lithium exchanged NaX having at least about 88% of its AlO$_2$ tetrahedral units associated with lithium cations.

28. The process of claim 27 in which the molar ratio of the SiO$_2$/Al$_2$O$_3$ framework of said NaX is less than 3.0.

29. The process of claim 28 in which said SiO$_2$/Al$_2$O$_3$ molar ratio is from 2.0 to 2.5.

30. The process of claim 29 in which said lithium exchange is at least about 95%.

31. The process of claim 30 in which said SiO$_2$/Al$_2$O$_3$ molar ratio is 2.0.

32. The process of claim 30 in which said SiO$_2$/Al$_2$O$_3$ molar ratio is 2.5.

33. The process of claim 29 in which said lithium exchange is about 97%.

34. The process of claim 25 in which said adsorbent comprises NaX zeolite adsorbent modified by caustic digestion at elevated temperature to increase the zeolite content thereof.

* * * * *